(12) United States Patent
Deardurff

(10) Patent No.: US 7,481,875 B2
(45) Date of Patent: Jan. 27, 2009

(54) ADDITIVE TO IMPROVE OZONE STABILITY OF DYES ON POROUS MEDIA

(75) Inventor: Larrie Deardurff, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 11/649,700

(22) Filed: Jan. 3, 2007

(65) Prior Publication Data

US 2008/0160207 A1  Jul. 3, 2008

(51) Int. Cl.
*C09D 11/02* (2006.01)
*B41J 2/01* (2006.01)
(52) U.S. Cl. ............ 106/31.27; 106/31.6; 106/31.49; 106/31.51; 106/31.48; 106/31.52; 347/100

(58) Field of Classification Search ........... 106/31.27, 106/31.6, 31.49, 31.51, 31.52, 31.48; 347/100
See application file for complete search history.

(56) References Cited

U.S. PATENT DOCUMENTS

| | | | | |
|---|---|---|---|---|
| 6,533,398 B2* | 3/2003 | Katsuragi et al. | ............ | 347/56 |
| 6,550,903 B2* | 4/2003 | Katsuragi et al. | ............ | 347/96 |
| 6,607,266 B2* | 8/2003 | Katsuragi et al. | ............ | 347/96 |
| 6,827,434 B1* | 12/2004 | Katsuragi et al. | ........... | 347/100 |
| 2005/0109236 A1* | 5/2005 | Yabuki et al. | ............ | 106/31.27 |
| 2007/0095250 A1* | 5/2007 | Uhlir-Tsang et al. | ..... | 106/31.27 |
| 2007/0132823 A1* | 6/2007 | Barreto et al. | ............ | 347/100 |

* cited by examiner

*Primary Examiner*—Helene Klemanski

(57) ABSTRACT

An inkjet ink includes an aqueous liquid vehicle, at least 1% by weight dye, and an ozone stability enhancing quantity of gluconate ions.

20 Claims, 2 Drawing Sheets

ADDITIVE TO IMPROVE OZONE STABILITY OF DYES ON POROUS MEDIA

BACKGROUND

Ink jet images printed on the newer "instant dry" porous media generally suffer from fade or image loss caused by exposure to air pollutants. It has been shown in scientific literature that ozone exposure is the single most important factor of image loss. Images that are displayed unprotected, e.g., not framed, can show noticeable degradation in weeks or months. Current methods available to slow this degradation include protecting the image by framing it behind glass or placing it in a photo album. An alternate approach includes printing with colorants that are intrinsically stable toward ozone exposure.

Unfortunately ozone degradation is not the only source of fade or image loss. Light exposure may also contribute to image loss or fade to an inkjet image. Furthermore dyes that are both ozone stable and stable toward light exposure are difficult to manufacture and not easily available for purchase. For example azo dyes based on H-acid tend to be ozone stable, but very light unstable. On the other hand, azo dyes based on gamma-acid tend to be light stable, but very unstable to the effects of ozone. Additionally, Phthalocyanine dyes tend to be unstable toward ozone but light stable.

Various methods have been tried to improve ozone stability, such as adding sacrificial materials that remove ozone by chemical reaction. This solution is merely temporary, because once the sacrificial material is fully consumed by the chemical reaction the dyes will start to fade. Alternately, a few dyes have been found to have improved both light and ozone stability, but are still not as stable as would be desired. In some 3-color (e.g. cyan, magenta and yellow inks) printing systems one or more of the dyes used might have more ozone stability than the other(s) dyes. This can lead to color imbalance during image degradation which may result in the image being unacceptable before the dyes themselves had faded to an unacceptable level.

SUMMARY

According to one exemplary embodiment, an inkjet ink includes an aqueous liquid vehicle, at least 1% by weight dye, and an ozone stability enhancing quantity of gluconate ions.

A method of producing an inkjet ink having increased ozone stability includes providing an aqueous liquid vehicle, adding between 0.1-10% by weight of gluconate ions to the liquid vehicle, and adding between 1-10% by weight of a colorant to the liquid vehicle and gluconate ions A method of printing includes the steps of providing an ink having an aqueous liquid vehicle, at least 1% by weight dye, and an ozone stability enhancing quantity of gluconate ions. The method further includes the steps of providing a porous medium having a surface and depositing the inkjet ink on the surface of the porous medium.

BRIEF DESCRIPTION OF THE DRAWINGS

The accompanying drawing illustrates various embodiments of the present invention and is a part of the specification. The illustrated embodiment is merely an example of the present invention and does not limit the scope of the invention.

Throughout the drawing, identical reference numbers designate similar, but not necessarily identical, elements.

DETAILED DESCRIPTION

Figure 1:
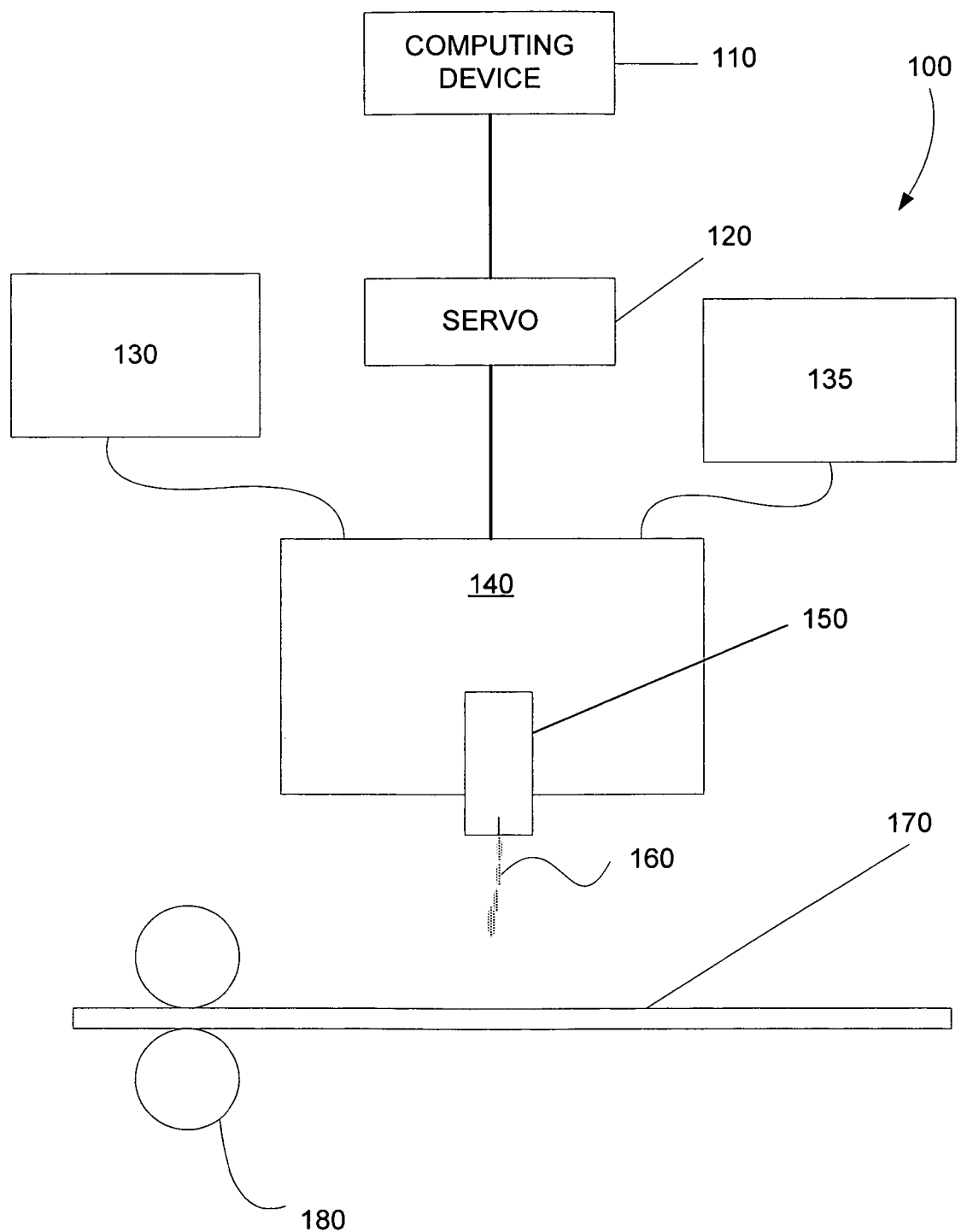
FIG. 1 is a simple block diagram illustrating an inkjet material dispensing system, according to one exemplary embodiment.

The present specification discloses an exemplary additive for inkjet ink formulation configured to enhance the ozone stability characteristics of inkjet ink. Consequently, the present exemplary additive minimizes image degradation on a number of desired substrates including, but in no way limited to, photo media and porous media. According to one exemplary embodiment disclosed herein, the present ozone stable dyes are blended with a magnesium gluconate salt to minimize image degradation. Further details of the present inkjet ink formulation will be provided below.

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined only by the appended claims and equivalents thereof. In describing and claiming the present exemplary system and method, the following terminology will be used.

The singular forms "a," "an," and "the" include plural referents unless the context clearly dictates otherwise. Thus, for example, reference to "a pigment" includes reference to one or more of such materials.

As used in the present specification and in the appended claims, the term "liquid vehicle" is defined to include liquid compositions that can be used to carry colorants, including pigments and/or binders to a substrate. Liquid vehicles are well known in the art and a wide variety of liquid vehicle components may be used in accordance with embodiments of the present exemplary system and method. Such liquid vehicles may include a mixture of a variety of different agents, including without limitation, surfactants, solvents, co-solvents, buffers, biocides, viscosity modifiers, sequestering agents, stabilizing agents, and water. Though not liquid per se, the liquid vehicle can also carry other solids, such as polymeric binders, UV curable materials, plasticizers, co-solvents, salts, etc.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In the following description, for purposes of explanation, numerous specific details are set forth in order to provide a thorough understanding of the present system and method for forming an ozone stable inkjet ink. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

FIG. 1 illustrates an exemplary system (100) that may be used to apply a dye-based inkjet ink (160) to an ink receiving medium (170) according to one exemplary embodiment. As shown in FIG. 1, the present system includes a computing device (110) controllably coupled through a servo mechanism (120) to a moveable carriage (140) having an inkjet dispenser (150) disposed thereon. A material reservoir (130) is also coupled to the moveable carriage (140), and consequently to the inkjet print head (150). A number of rollers (180) are located adjacent to the inkjet dispenser (150) configured to selectively position an ink receiving medium (170). While the present exemplary system (100) is described in the context of applying a dye-based inkjet ink (160) onto an ink receiving medium (170), the present system and method may be used to mark any number of items with the present dye-based inkjet ink. The above-mentioned components of the present exemplary system (100) will now be described in further detail below.

The computing device (110) that is controllably coupled to the servo mechanism (120), as shown in FIG. 1, controls the selective deposition of a dye-based inkjet ink (160) on an ink receiving medium (170). A representation of a desired image or text may be formed using a program hosted by the computing device (110). That representation may then be converted into servo instructions that are then housed in a processor readable medium (not shown). When accessed by the computing device (110), the instructions housed in the processor readable medium may be used to control the servo mechanisms (120) as well as the movable carriage (140) and inkjet dispenser (150). The computing device (110) illustrated in FIG. 1 may be, but is in no way limited to, a workstation, a personal computer, a laptop, a personal digital assistant (PDA), or any other processor containing device.

The moveable carriage (140) of the present printing system (100) illustrated in FIG. 1 is a moveable material dispenser that may include any number of inkjet material dispensers (150) configured to dispense the present dye-based inkjet ink (160). The moveable carriage (140) may be controlled by a computing device (110) and may be controllably moved by, for example, a shaft system, a belt system, a chain system, etc. making up the servo mechanism (120). As the moveable carriage (140) operates, the computing device (110) may inform a user of operating conditions as well as provide the user with a user interface.

As an image or text is printed on an ink receiving medium (170), the computing device (110) may controllably position the moveable carriage (140) and direct one or more of the inkjet dispensers (150) to selectively dispense a dye-based inkjet ink at predetermined locations on ink receiving medium (170) as digitally addressed drops, thereby forming the desired image or text. The inkjet material dispensers (150) used by the present printing system (100) may be any type of inkjet dispenser configured to perform the present method including, but in no way limited to, thermally actuated inkjet dispensers, mechanically actuated inkjet dispensers, electrostatically actuated inkjet dispensers, magnetically actuated dispensers, piezoelectrically actuated dispensers, continuous inkjet dispensers, etc.

The material reservoir (130) that is fluidly coupled to the inkjet material dispenser (150) houses the present dye-based inkjet ink (160) prior to printing. The material reservoir may be any container configured to hermetically seal the dye-based inkjet ink (160) prior to printing and may be constructed of any number of materials including, but in no way limited to metals, plastics, composites, or ceramics. As illustrated in FIG. 1, the material reservoir (130) may be separate from, yet fluidly coupled to the inkjet material dispenser (150). Alternatively, the material reservoir (130) may be directly coupled to and form a part of the inkjet material dispenser (150).

FIG. 1 also illustrates the components of the present system that facilitate reception of the dye-based inkjet ink (160) onto the ink receiving medium (170). As shown in FIG. 1, a number of positioning rollers (180) may transport and/or positionally secure an ink receiving medium (170) during a printing operation. Alternatively, any number of belts, rollers, substrates, or other transport devices may be used to transport and/or positionally secure the ink receiving medium (170) during a printing operation, as is well known in the art.

Recently, it has been desirous that inkjet dispensing systems be configured to dispense inks that are ozone stable. As used here, the term "ozone stable" is meant to be understood as including any inkjet ink that does not rapidly break down after exposure to ozone. For the purposes of this document an explanation of exemplary inkjet inks is necessary.

Ink Vehicle

According to one exemplary embodiment, the present exemplary ink vehicle includes, but is in no way limited to, a base vehicle primarily including water, humectant co-solvents such as 2-pyrrolidone, and a wetting package.

According to one exemplary embodiment, the present exemplary ink vehicle includes a number of humectant co-solvents configured to provide hydrophilic properties to the resulting ink, while aiding in the dissolution and/or dispersing of ink components. According to one exemplary embodiment, the present ink vehicle may include any number of humectant co-solvents including, but in no way limited to, 2-pyrolidinone, ethoxylated glycerol, glycerol, diethylene glycol, trimethylolpropane, 1,5-pentanediol, and/or the like.

In addition to the above exemplary specific co-solvents that can be used, classes of co-solvents that can be used include, but are in no way limited to, aliphatic alcohols, aromatic alcohols, diols, glycol ethers, polyglycol ethers, caprolactams, formamides, acetamides, and long chain alcohols.

Examples of such compounds include, but are in no way limited to, primary aliphatic alcohols, secondary aliphatic alcohols, 1,2-alcohols, 1,3-alcohols, 1,5-alcohols, 1,6-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like.

According to one exemplary embodiment, the present exemplary ink vehicle includes between approximately 10% and 70% humectant co-solvents. More particularly, according to one exemplary embodiment, the present exemplary ink vehicle includes between approximately 10% and approximately 35% 2-pyrolidinone.

Further, in addition to the above-mentioned components of the present exemplary vehicle, various other additives may be employed to optimize the properties of the resulting inkjet ink composition for specific applications. More specifically, examples of acceptable additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Further, sequestering agents, such as EDTA (ethylene diamine tetraacetic acid), may be included to eliminate the deleterious effects of heavy metal impurities, and buffer solutions may be used to control the pH of the resulting ink. According to one exemplary embodiment, from 0 wt % to 2.0 wt %, of the vehicle, for example, can include sequestering agents. Viscosity modifiers and buffers may also be present, as well as other additives known to those skilled in the art to modify properties of the ink as desired. Such additives can be present at, according to one exemplary embodiment, from 0 wt % to 20.0 wt %.

Dye

A dye is to be provided in the inkjet ink formulation to impart color to the resulting ink. According to this exemplary embodiment, appropriate dye-based inks include, but are in no way limited to anionic dye-based inks having water-soluble acid and direct dyes.

Though any effective amount of dye can be used in the present inkjet ink formulation, the inkjet ink can comprise from approximately 0.1 wt % to 10 wt % of the dye. Examples of suitable anionic dyes include a large number of water-soluble acid and direct dyes. Specific examples of anionic dyes include the Pro-Jet series of dyes available from FujiFilm Imaging Colorants, including Direct Yellow 86, Acid Red 249, Direct Blue 199, Direct Black 168, Direct Yellow 132; Aminyl Brilliant Red F-B (Sumitomo Chemical Co.); the Duasyn line of "salt-free" dyes available from Hoechst, such as Reactive Black 31, Direct Yellow 157, Reactive Yellow 37, Acid Yellow 23, Reactive Red 180, Acid Red 52, and Acid Blue 9; mixtures thereof; and the like. Further examples include Tricon Direct Red 227, and Tricon Acid Yellow 17 (Tricon Colors Incorporated), Bernacid Red 2BMN, Pontamine Brilliant Bond Blue A, BASF X-34, Pontamine, Food Black 2, Carolina Color and Chemical), Direct Blue 86, Mobay Chemical), Reactive Red 4, Aldrich Chemical, Reactive Red 56, Pylam, Inc.), Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Pro-Jet 485 (a copper phthalocyanine); Magenta 377; Yellow 1189; mixtures thereof; and the like. This list is intended to be merely exemplary, and should not be considered limiting.

In some embodiments the dye may comprise phthalocyanine dyes, azo dyes, and/or combinations thereof.

Additives

In the present system and method, the polymeric colorant can include various stabilizing additives. Such stabilizing additives can be any functional group which provides improved lightfastness, bronzing, solubilization, steric stabilization, electrostatic stabilization, or the like Ozone Stability Additive More specifically the present system and method uses a gluconate salt additive to improve the ozone stability of the inkjet ink. The presence of gluconate ions has been found in test cases to improve the ozone stability of the inkjet ink without decrementing light stability of the ink. In some embodiments, the gluconate ions are in combination with a cation selected from the group consisting of magnesium, sodium, potassium, calcium, ammonium, alkyl ammonium and combinations thereof.

In many of the test cases used to develop the disclosed technology, the inkjet ink contained magnesium nitrate hexahydrate ($Mg(NO_3)_2\cdot 6H_2O$). This was replaced in the ink by the gluconate salt, magnesium gluconate ($Mg(gluconate)_2$, $C_{12}H_{22}MgO_{14}$). By substituting the $Mg(NO_3)_2\cdot 6H_2O$ with a measured amount of $Mg(gluconate)_2$, it was possible to have an ink that was equimolar in magnesium ions. Maintaining a certain level of magnesium in an ink enables the ink to retain a good black to color bleed control. Additionally, to balance the amount of organic material in the ink to the same level as found in a typical ink, three solvent components, i.e., 2-pryollidinone, EHPD, and 1,4-butandiol (cyan) or 1,6-hexanediol (magenta and yellow inks), were each decreased. After these changes were made, the ink formulated with the $Mg(gluconate)_2$ was placed into inkjet pens and printed in the usual manner to determine ozone stability characteristics.

Additionally, one could formulate this same ozone stabilizing composition by blending in equimolar amounts of $Mg(NO_3)_2$ and NaGluconate. This effectually would add the major components of the oxide stabilizing compound. Alternate embodiments may include, but are not limited to, other gluconate salts such as sodium gluconate, potassium gluconate, beryllium gluconate, calcium gluconate, strontium gluconate, barium gluconate. Although there are a few ways to reach the proper balance of magnesium and gluconate in an ink, it should be understood that the present system and method encompasses any mixture of compounds which uses a gluconate salt additive to improve ozone stability in dyes.

One of the major advantages provided by the present system and method is the longevity of the ozone stability. As described before, one way to temporarily increase ozone stability is by adding sacrificial materials, which must be used up before significant fade occurs. This is not optimal, because solution is at best temporary because it relies on a chemical reaction to produce an advantage. A solution that does not require a chemical reaction to maintain ozone stability would be optimal. In the present system and method ozone stability is improved without a dependence on a chemical reaction. Ozone stability is maintained by non-sacrificial gluconate ions in the inkjet ink. Therefore, it can be assumed that the improvements made by the present system and method should not decrease with time.

Among the advantages of a gluconate additive is broad applicability. In most cases the increase of ozone stability is desirable, and therefore, the advantages of the gluconate salt additive would be desirable in most inks. Research has shown that process of adding a gluconate salt can be done with any dye, with similar ozone stabilization in formulated ink mixtures. Due to the compatible nature of the additive, new development of dyes is unnecessary to benefit from the present system and method. Thus, gluconate salt additives are optimally suited for wide scale implementation to improve the ozone stability of current inkjet inks, thereby benefiting manufactures, retailers and customers alike butandiol According to one exemplary embodiment, the present exemplary inkjet ink formulation may be incorporated into any type of inkjet material dispenser including, but in no way limited to, thermally actuated inkjet dispensers, mechanically actuated inkjet dispensers, electrostatically actuated inkjet dispensers, magnetically actuated dispensers, piezoelectrically actuated dispensers, continuous inkjet dispensers, etc. In the case of thermally actuated inkjet dispensers considerations such as decap time, and temperature effects on ink, must be taken into account. The elevated heat that is required to thermally jet an ink solution can cause excessive residue to block the nozzle of the jet. In the case of decap time, the length of time that a fluid remains a liquid while being exposed to the atmosphere in the nozzle, differences in the chemical components of an ink can adversely reduce the decap time. The present system and method does not adversely effect either decap time or temperature effects, which is another advantage of the present system and method.

Figure 2:
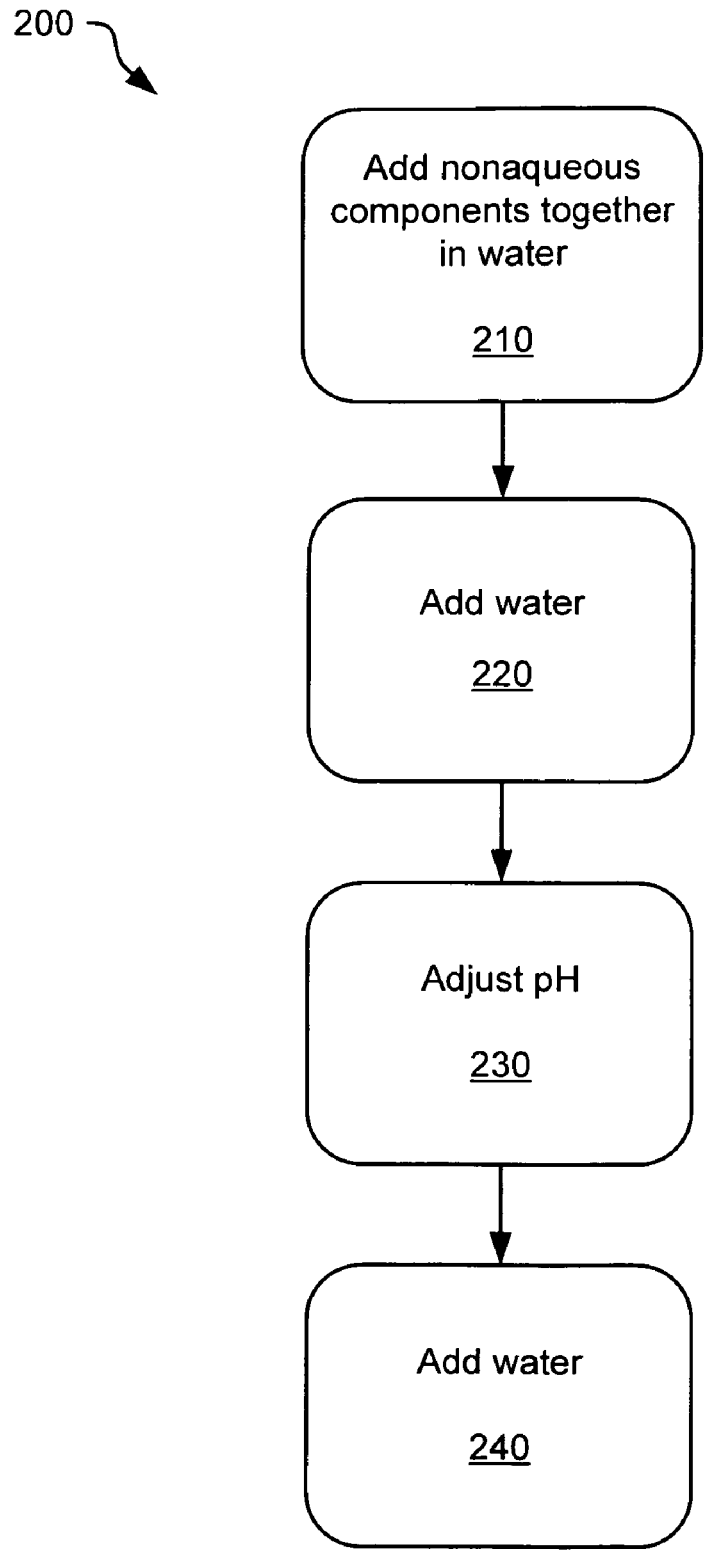
FIG. 2 is a flowchart illustrating an exemplary method of forming an inkjet ink, according to principles described herein.

Exemplary Formation Method butandiol Referring now to FIG. 2, according to one exemplary method (200), the above-mentioned components are selectively combined to form an inkjettable ink. Formation of the inkjettable ink begins, according to one embodiment, by first adding (step 210) all of the nonaqueous components of the ink, including the gluconate salt additive to water and mixing. Additional water may then be added (step 220) to the components.

Once the ink formulation is formed, as described above, the pH of the ink formulation may then be adjusted (step 230) to be in the range of approximately 6-8 with a pH adjustor such as potassium hydroxide or nitric acid according to the specific pH requirements of the ink. The remainder of the water may subsequently be added (step 240).

Once the inkjet ink compositions are prepared, they can be placed into one or more inkjet pens as is well known in the art. In one detailed aspect of the present exemplary system and method, an inkjet pen or other system for printing images on a substrate in accordance with the present system and method can include at least one firing chamber containing inkjet ink compositions, respectively, to form an inkjet pen. Typical inkjet pens can have an orifice plate having a plurality of orifices through which the inkjet ink composition can be delivered to a substrate. According to one exemplary embodiment, the present exemplary inkjet ink formulation may be incorporated into any type of inkjet material dispenser including, but in no way limited to, thermally actuated inkjet dispensers, mechanically actuated inkjet dispensers, electrostatically actuated dispensers, magnetically actuated dispensers, piezoelectrically actuated dispensers, continuous inkjet dispensers, etc. Additionally, the present inkjettable ink may be dispensed from non-inkjet sources such as, but in no way limited to, screen printing apparatuses, stamping apparatuses, pressing apparatuses, gravure printing apparatuses, and the like.

EXAMPLES

The following examples illustrate a number of embodiments of the present systems and methods that are presently known. However, it is to be understood that the following are only exemplary or illustrative of the application of the principles of the present systems and methods. Numerous modifications and alternative compositions, methods, and systems may be devised by those skilled in the art without departing from the spirit and scope of the present systems and methods. The appended claims are intended to cover such modifications and arrangements. Thus, while the present systems and methods have been described above with particularity, the following examples provide further detail in connection with what are presently deemed to be the acceptable embodiments.

Example 1

According to the present exemplary system, a number of inkjet ink formulations, of different colors were prepared according to the above-mentioned exemplary methods and dispensed by an inkjet material dispenser. Table 1 also demonstrates the difference in composition of three different colors of ink, each having a control formulation with Mg(NO3)2-6H2O, and a formulation having a Mg(Gluconate)2 hydrate additive. Table 1 below illustrates the formulations generated, according to one exemplary embodiment.

TABLE 1

| | % by weight composition | | | | | |
|---|---|---|---|---|---|---|
| | Cyan Ink | | Magenta Ink | | Yellow Ink | |
| Materials | Control | Gluconate | Control | Gluconate | Control | Gluconate |
| 2-pyrrolidinone | 6.50 | 4.90 | 6.50 | 4.90 | 6.50 | 4.90 |
| Ethylhydroxypropanediol (EHPD) | 8.00 | 6.40 | 8.00 | 6.40 | 8.00 | 6.40 |
| 1,4-Butanediol | 4.50 | 2.90 | 4.50 | 2.90 | 4.50 | 2.90 |
| 1,6-Hexanediol | | | | | | |
| Tergitol 15S-5 | 0.50 | 0.50 | 0.50 | 0.50 | 0.50 | 0.50 |
| Tergitol 15S-7 | 0.50 | 0.50 | 0.50 | 0.50 | 0.50 | 0.50 |
| Dowfax 8390 | 0.40 | 0.40 | 0.40 | 0.40 | 0.40 | 0.40 |
| Phenylenediamine compound derivative | 11.40 | 11.40 | | | | |
| EDTA disodium salt | 0.10 | 0.10 | 0.10 | 0.10 | 0.10 | 0.10 |
| MES Sodium salt | 0.20 | 0.20 | 0.20 | 0.20 | 0.20 | 0.20 |
| Mg(NO3)2-6H2O | 3.00 | | 3.00 | | 3.00 | |
| Mg(Gluconate)2 hydrate | | 4.85 | | 4.85 | | 4.85 |
| Proxel GXL | 0.10 | 0.10 | 0.10 | 0.10 | 0.10 | 0.10 |
| % wt Dye | | | | | | |
| Dye #1 | 4.30% | | | | | |
| AB9 Dye | 0.10% | | | | | |
| Dye #2 | | | 3.8% | | | |
| pRR180 | | | 0.9% | | | |
| Y1189 Dye | | | | | 3.6% | |

The present formulations as found in Table 1 each included 2-pyrrolidinone, Ethylhydroxypropanediol (EHPD), Tergitol 15-S-5, Tergitol 15-S-7, Dowfax 8390, EDTA disodium salt, MES Sodium salt, Mg(NO3)2-6H2O), Mg(Gluconate)2 hydrate, Proxel GXL, and water. Whereas the cyan inks had 1,4-Butanediol in each formulation, the magenta and yellow inks had 1,6-Hexanediol. The exemplary inkjet ink formulation also includes a dye to give the inkjet formulation a desired color. Dye #1 of this example was a phthalocyanine cyan dye having the general structure shown in Formula 1:

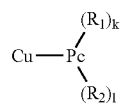

Formula 1

Dye #1 has functional groups $R_1=SO_2(CH_2)_3SO_3M$, k=1.5-3, M=Li, K, or Na $R_2=SO_2(CH_3)_3SO_2NHCH_2CH(OH)CH_3$, and l=1-2.5 where k+l=4. $P_c$ in Formula 1 represents a phthalocyanine group which is well known in the art.

Dye #2 of this example was a magenta azo dye having the general structure shown in Formula 2:

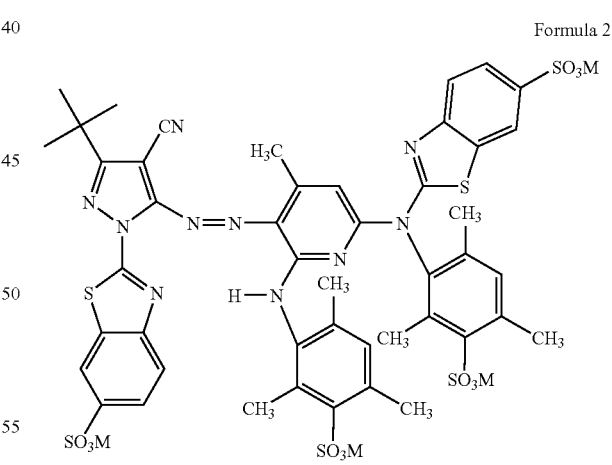

Formula 2

Further, the exemplary ink formulations of Table 1 contained a phenylenediamine compound derivative having the CA index name Ethanesulfonic acid, 2,2'-[1,3-phenylenebis[imino[6-[bis(2-hydroxyethyl) amino]-1,3,5-triazine-4,2-diyl]imino]]bis-, disodium salt. The presence of the phenylenediamine compound derivative acts as a deflocculant reducing the unwanted aggregation of dyes in the ink. In an embodiment, the diphenylamine additive improves the quality of the printed images. The phenylenediamine compound derivative is further described in European Patent Publication EP1514913A2.

As indicated by Table 1, each gluconate ink had at least 4.85% wt., of Mg(gluconate)2 hydrate. Table 1 merely represents exemplary formulation of the ink, and is not intended to be limiting in any way.

The ink formulations of Table 1 were put into thermal inkjet pens and printed on porous media. Both the control and gluconate salt additive containing inks were subjected to ozone fade tests in which test patches having initially equal optical densities were exposed to ozone gas in amounts simulating likely ozone gas exposure that would normally occur from a period of 0 to about 355 ppm-hrs. The optical densities were measured periodically as a function of simulated exposure, and the following average data were produced as a best regression fit to data model:

TABLE 2

| | Optical Density (Magenta Ink) | |
|---|---|---|
| ppm-hrs | Control | Mg(gluconate)2 additive |
| 0 | 0.986 | 0.991 |
| 23.7 | 0.966 | 0.976 |
| 45.2 | 0.948 | 0.963 |
| 61.97 | 0.934 | 0.952 |
| 86.01 | 0.915 | 0.938 |
| 106.35 | 0.899 | 0.925 |
| 127.41 | 0.882 | 0.913 |
| 149.38 | 0.866 | 0.900 |
| 219.88 | 0.814 | 0.860 |
| 261.56 | 0.785 | 0.838 |
| 308.76 | 0.753 | 0.813 |
| 354.72 | 0.723 | 0.789 |

As demonstrated by the data of Table 2, the inks containing the gluconate salt additive exhibited a marked improvement in ozone fade resistance over the control inks.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. An inkjet ink, comprising:
an aqueous liquid vehicle;
at least 1% by weight colorant; and
an ozone stability enhancing quantity of a compound comprising gluconate ions;
wherein said compound comprising said gluconate ions is present in a quantity greater than 2% by weight of said ink.

2. The inkjet ink of claim 1, wherein said compound comprising gluconate ions are present in a quantity up to 10% by weight.

3. The inkjet ink of claim 1, wherein said gluconate ions are present in combination with magnesium ions.

4. The inkjet ink of claim 3, wherein said magnesium ions comprise a molar quantity of magnesium cations such that additional magnesium-based additives are not required for black to color bleed control of said inkjet ink.

5. The inkjet ink of claim 1, wherein said colorant is selected from the group consisting of phthalocyanine dyes and azo dyes.

6. The inkjet ink of claim 5, wherein said phthalocyanine dye is a cyan dye comprising the structure:

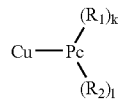

wherein
$R_1=SO_2(CH_2)_3SO_3M$, k=1.5-3, M=Li, K, or Na $R_2=SO2(CH_3)_3SO_2NHCH_2CH(OH)CH_3$, and 1=1-2.5 where k+1=4.

7. The inkjet ink of claim 5, wherein said azo dye comprises a magenta dye including the structure:

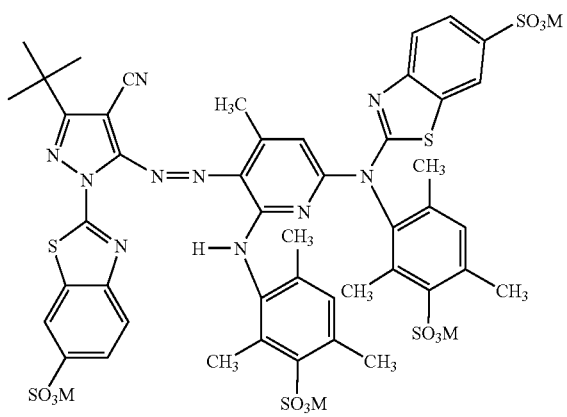

wherein M=Li, K, Na.

8. The inkjet ink of claim 1, further comprising a deflocculant phenylenediamine compound derivative.

9. A method of forming an inkjet ink having increased ozone stability, comprising:
providing an aqueous liquid vehicle;
adding between greater than 2% and up to 10% by weight of a compound comprising gluconate ions to said liquid vehicle; and
adding between 1-10% by weight colorant to said liquid vehicle and gluconate ions.

10. The method of claim 9, wherein said gluconate ions are in combination with a cation selected from the group consisting of magnesium, sodium, potassium, calcium, ammonium, alkyl ammonium and combinations thereof.

11. The method of claim 9, further comprising determining a molar quantity of magnesium cation to be present in said inkjet ink for sufficient color to black bleed control.

12. The method of claim 11, wherein said gluconate ions are added as magnesium (gluconate)2 added in a quantity such that said molar quantity of said magnesium cation is present in said inkjet ink.

13. The method of claim 9, wherein said aqueous liquid vehicle comprises a deflocculant phenylenediamine compound derivative.

14. The method of claim 9, wherein said colorant comprises a phthalocyanine dye.

15. A method of printing, comprising:
providing an ink having an aqueous liquid vehicle, at least 1% by weight dye, and greater than 2% by weight of an ozone stability enhancing compound comprising gluconate ions;

providing a porous medium having a surface; and depositing said inkjet ink on said surface of said porous medium.

16. The method of claim 15, wherein said compound comprising gluconate ions is present in said inkjet ink in a quantity up to 10% by weight.

17. The method of claim 15, wherein said gluconate ions are in combination with magnesium ions.

18. The method of claim 15, wherein said porous medium is a paper-base or a photo-base medium.

19. The method of claim 15, further comprising providing a plurality of differently colored dye-based inks, at least one of said inks comprising said ozone stability enhancing compound of gluconate ions.

20. The method of claim 15, further comprising providing a plurality of dye-based inks, wherein said dye-based inks comprise dyes of different colors, each comprising a same quantity by weight of said compound comprising gluconate ions.

* * * * *

UNITED STATES PATENT AND TRADEMARK OFFICE
CERTIFICATE OF CORRECTION

PATENT NO. : 7,481,875 B2
APPLICATION NO. : 11/649700
DATED : January 27, 2009
INVENTOR(S) : Larrie Deardurff Page 1 of 2

It is certified that error appears in the above-identified patent and that said Letters Patent is hereby corrected as shown below:

In column 8, line 1, delete "alike butandiol" and insert -- alike. --, therefor.

In column 8, line 21, after "Method" delete "butandiol".

In column 9, lines 10-36, delete "

|  | % by weight composition ||||||
|---|---|---|---|---|---|---|
|  | Cyan Ink || Magenta Ink || Yellow Ink ||
| Materials | Control | | Control | | Control | |
| 2-pyrrolidinone | 6.50 | | 6.50 | | 6.50 | |
| Ethylhydroxypropanediol (EHPD) | 8.00 | | 8.00 | | 8.00 | |
| 1,4-Butanediol | 4.50 | | 4.50 | | 4.50 | |
| 1,6-Hexanediol | | | | | | |
| Tergitol 15S-5 | 0.50 | | 0.50 | | 0.50 | |
| Tergitol 15S-7 | 0.50 | | 0.50 | | 0.50 | |
| Dowfax 8390 | 0.40 | | 0.40 | | 0.40 | |
| Phenylenediamine compound derivative | 11.40 | | | | | |
| EDTA disodium salt | 0.10 | | 0.10 | | 0.10 | |
| MES Sodium salt | 0.20 | | 0.20 | | 0.20 | |
| Mg(NO3)2-6H2O | 3.00 | | 3.00 | | 3.00 | |
| Mg(Gluconate)2 hydrate | | | | | | |
| Proxel GXL | 0.10 | | 0.10 | | 0.10 | |
| % wt Dye | | | | | | |
| Dye #1 | 4.30% | | | | | |
| AB9 Dye | 0.10% | | | | | |
| Dye #2 | | | 3.8% | | | |
| pRR180 | | | 0.9% | | | |
| Y1189 Dye | | | | | 3.6% | |

"

and insert

Signed and Sealed this

Twenty-ninth Day of June, 2010

David J. Kappos
*Director of the United States Patent and Trademark Office*

| Materials | % by weight composition | | | | | |
|---|---|---|---|---|---|---|
| | Cyan Ink | | Magenta Ink | | Yellow Ink | |
| | Control | Gluconate | Control | Gluconate | Control | Gluconate |
| 2-pyrrolidinone | 6.50 | 4.90 | 6.50 | 4.90 | 6.50 | 4.90 |
| Ethylhydroxypropanediol (EHPD) | 8.00 | 6.40 | 8.00 | 6.40 | 8.00 | 6.40 |
| 1,4-Butanediol | 4.50 | 2.90 | | | | |
| 1,6-Hexanediol | | | 4.50 | 2.90 | 4.50 | 2.90 |
| Tergitol 15S-5 | 0.50 | 0.50 | 0.50 | 0.50 | 0.50 | 0.50 |
| Tergitol 15S-7 | 0.50 | 0.50 | 0.50 | 0.50 | 0.50 | 0.50 |
| Dowfax 8390 | 0.40 | 0.40 | 0.40 | 0.40 | 0.40 | 0.40 |
| Phenylenediamine compound derivative | 11.40 | 11.40 | | | | |
| EDTA disodium salt | 0.10 | 0.10 | 0.10 | 0.10 | 0.10 | 0.10 |
| MES Sodium salt | 0.20 | 0.20 | 0.20 | 0.20 | 0.20 | 0.20 |
| Mg(NO3)2-6H2O | 3.00 | | 3.00 | | 3.00 | |
| Mg(Gluconate)2 hydrate | | 4.85 | | 4.85 | | 4.85 |
| Proxel GXL | 0.10 | 0.10 | 0.10 | 0.10 | 0.10 | 0.10 |
| % wt Dye | | | | | | |
| Dye #1 | 4.30 % | | | | | |
| AB9 Dye | 0.10 % | | | | | |
| Dye #2 | | | 3.8 % | | | |
| pRR180 | | | 0.9 % | | | |
| Y1189 Dye | | | | | 3.6 % | | therefor.

In column 9, line 64, delete "1=1-2.5 where k+1=4." and insert -- 1=1-2.5 where k+1=4. --, therefor.

In column 12, lines 12-13, in Claim 6, delete "1=1-2.5 where k+1=4." and insert -- 1=1-2.5 where k+1=4. --, therefor.